US010727453B2

(12) United States Patent
Choi et al.

(10) Patent No.: US 10,727,453 B2
(45) Date of Patent: Jul. 28, 2020

(54) METHOD FOR SEALING POUCH CASING OF SECONDARY BATTERY (71) Applicant: LG CHEM, LTD., Seoul (KR)

(72) Inventors: Yong-Su Choi, Daejeon (KR); Sang-Hun Kim, Daejeon (KR); Min-Hyeong Kang, Daejeon (KR); Yong Kim, Daejeon (KR); Cho-Long Kim, Daejeon (KR); Hyung-Kyun Yu, Daejeon (KR); Ji-Hoon Lee, Daejeon (KR); Soo-Ji Hwang, Daejeon (KR)

(73) Assignee: LG Chem, Ltd. (KR)

( * ) Notice: Subject to any disclaimer, the term of this patent is extended or adjusted under 35 U.S.C. 154(b) by 143 days.

(21) Appl. No.: 15/776,248

(22) PCT Filed: Sep. 28, 2017

(86) PCT No.: PCT/KR2017/010880
§ 371 (c)(1),
(2) Date: May 15, 2018

(87) PCT Pub. No.: WO2018/062920
PCT Pub. Date: Apr. 5, 2018

(65) Prior Publication Data
US 2019/0207171 A1 Jul. 4, 2019

(30) Foreign Application Priority Data
Sep. 28, 2016 (KR) .................. 10-2016-0125013

(51) Int. Cl.
*H01M 2/02* (2006.01)
*H01M 2/08* (2006.01)
(Continued)

(52) U.S. Cl.
CPC ............. *H01M 2/021* (2013.01); *H01M 2/02* (2013.01); *H01M 2/0237* (2013.01);
(Continued)

(58) Field of Classification Search
CPC ............ H01M 2/02; H01M 2/10; H01M 2/12; H01M 10/04; H01M 10/0525
See application file for complete search history.

(56) References Cited

U.S. PATENT DOCUMENTS

2006/0210872 A1 9/2006 Yageta et al.
2006/0286450 A1* 12/2006 Yoon .................... H01M 2/021
429/180
(Continued)

FOREIGN PATENT DOCUMENTS

JP 2004-087239 A 3/2004
JP 2006-040747 A 2/2006
(Continued)

OTHER PUBLICATIONS

International Search Report for PCT/KR2017/010880 (PCT/ISA/210) dated Feb. 2, 2018.

*Primary Examiner* — Kenneth J Douyette
(74) *Attorney, Agent, or Firm* — Lerner, David, Littenberg, Krumholz & Mentlik, LLP (57) ABSTRACT

The present disclosure relates to a method for sealing a pouch casing of a pouch-type secondary battery, which includes the steps of: a receiving step in which an electrode assembly is received in an inner space formed between an upper pouch and a lower pouch; and a sealing step in which a first pressure is applied to an outer circumferential sealing portion, where the upper pouch and the lower pouch are sealed, in the longitudinal direction, and then the pressure is relieved, wherein the sealing step is carried out by applying external force to the upper pouch in the upward direction and to the lower pouch in the downward direction, or by applying a second pressure working in perpendicular to the first pressure to the sealing portion from the inner part of the pouch casing in a direction toward the outside.

13 Claims, 8 Drawing Sheets (51) Int. Cl.
*H01M 10/0585* (2010.01)
*H01M 10/04* (2006.01)

(52) U.S. Cl.
CPC ........... *H01M 2/0257* (2013.01); *H01M 2/08* (2013.01); *H01M 10/04* (2013.01); *H01M 10/0404* (2013.01); *H01M 10/0585* (2013.01)

(56) References Cited

U.S. PATENT DOCUMENTS

2012/0189879 A1* 7/2012 Fetzer ............... H01M 10/0525
                                                    429/50
2012/0321935 A1   12/2012 Kim et al.
2015/0171431 A1*  6/2015 Yamada .................. H01M 4/70
                                                    429/163

FOREIGN PATENT DOCUMENTS

| KR | 10-2012-0058960 A | 6/2012 |
| KR | 10-2014-0126482 A | 10/2014 |
| KR | 10-2015-0045097 A | 4/2015 |
| KR | 10-2015-0137742 A | 12/2015 |
| KR | 10-2016-0002176 A | 1/2016 |

* cited by examiner

METHOD FOR SEALING POUCH CASING OF SECONDARY BATTERY

TECHNICAL FIELD

The present disclosure relates to a method for sealing a pouch casing of a pouch-type secondary battery. More particularly, the present disclosure relates to a method for sealing a pouch casing of a secondary battery which can improve the durability of a sealing portion of a pouch-type secondary battery by improving a sealing process carried out for a pouch casing during the manufacture of a pouch-type secondary battery.

The present application claims priority to Korean Patent Application No. 10-2016-0125013 filed on Sep. 28, 2016 in the Republic of Korea, the disclosures of which are incorporated herein by reference.

BACKGROUND ART

Secondary batteries which show easy applicability to different product groups and have electrical properties, such as high energy density, have been applied generally to electric vehicles (EV) or hybrid vehicles (HV) driven by an electrical driving source as well as to portable instruments.

Such secondary batteries not only have a primary advantage of reducing use of fossil fuel significantly but also generate no byproduct resulting from use of energy, and thus have been given many attentions as novel energy sources capable of providing ecofriendly characteristics and improving energy efficiency.

Figure 1:
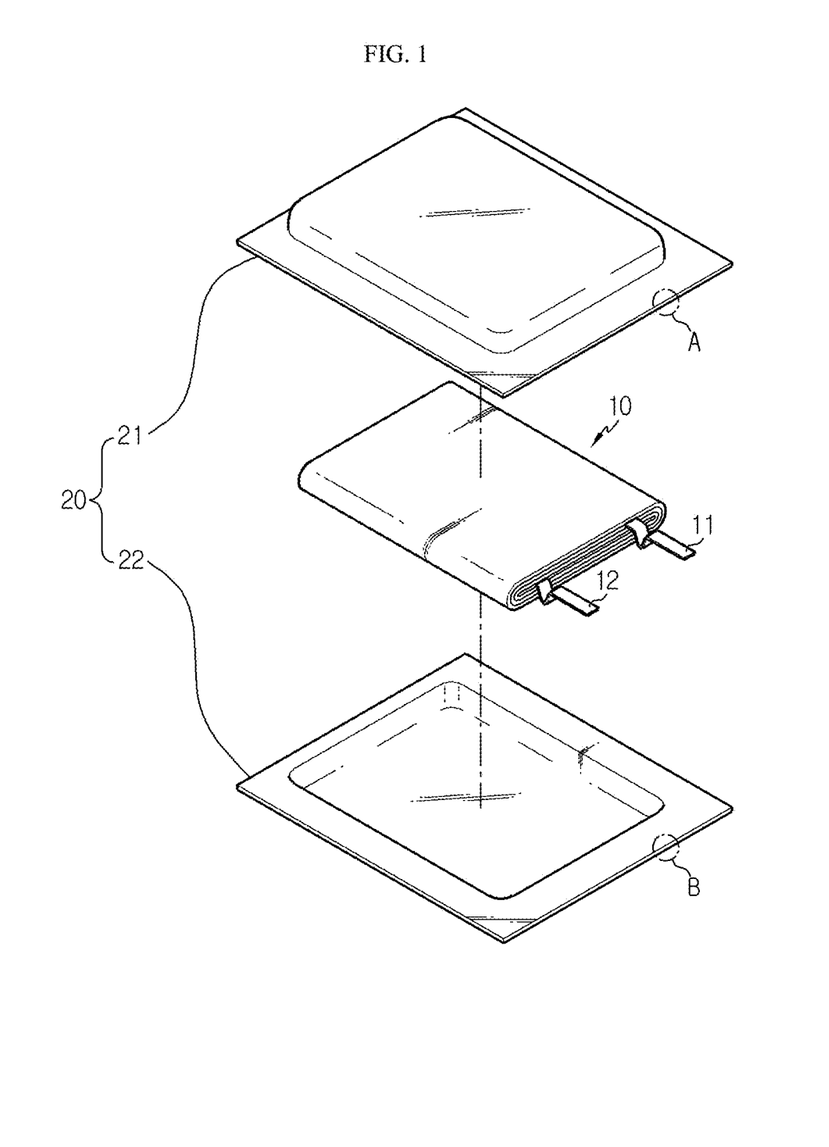
FIG. 1 is an exploded perspective view illustrating the structure of the conventional pouch-type secondary battery schematically.

FIG. 1 is an exploded perspective view illustrating the structure of the conventional pouch-type secondary battery schematically. Referring to FIG. 1, the conventional pouch-type secondary battery includes an electrode assembly 10 and a pouch casing 20 as a fundamental structure.

Herein, the electrode assembly 10 includes a positive electrode plate, a negative electrode plate and a separator interposed between the positive electrode plate and the negative electrode plate so that they may be insulated electrically from each other. In addition, the electrode assembly 10 is provided with a positive electrode tab extended from the positive electrode plate and a negative electrode tab extended from the negative electrode plate.

The positive electrode tab and the negative electrode tab may be bound to a positive electrode lead 11 and a negative electrode lead 12, respectively, through resistance welding, ultrasonic welding, laser welding, or the like. Such electrode leads are exposed to the outside of the pouch casing to carry out a function of connecting the secondary battery with an external applicable instrument electrically, as electrodes of the secondary battery.

The electrode assembly 10 is introduced to the pouch casing 20 together with an electrolyte.

The pouch casing 20 may be divided into an upper pouch 21 and a lower pouch 22, and may also be referred to as a single cap or double cap depending on the location of a portion where the electrode assembly 10 is received.

Such a pouch casing 20 may include aluminum foil inserted therein in order to protect an electrolyte introduced into the pouch casing and the electrode assembly 10, to supplement the electrochemical properties of a battery cell and to improve heat radiation property. Herein, the aluminum foil may have an insulation layer formed on the outside thereof, and the insulation layer may be coated with an insulation material, such as polyethylene terephthalate (PET) resin or nylon resin, to ensure insulation between the battery cell and the outside.

The pouch casing 20 may be bonded or adhered at the outer circumferential portion thereof through hot fusion, or the like, during a sealing process. To accomplish this, the bottom surface of the upper pouch 21 and the top surface of the lower pouch 22 may have an adhesive layer including casted polypropylene (PP) or polypropylene (PP) for the purpose of adhesion with each other. Such an adhesive layer functions to perform adhesion of the pouch casing 20 and serves as an insulation layer capable of preventing electric contact between the aluminum layer and the electrolyte introduced into the pouch casing 20.

Figure 2:
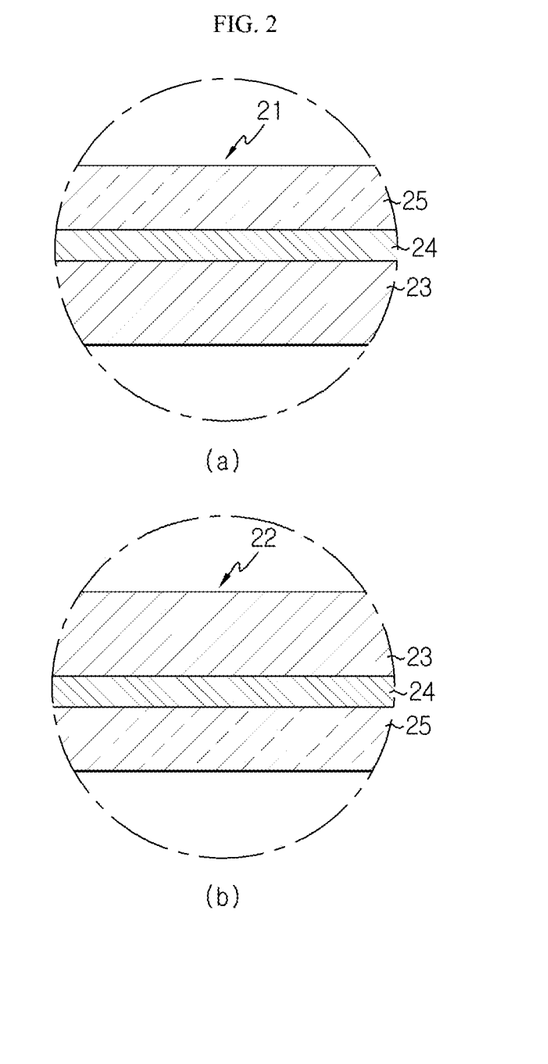
FIG. 2 is an enlarged sectional view of portion A and portion B of FIG. 1.

FIG. 2 is an enlarged sectional view illustrating portion A and portion B of FIG. 1. Referring to FIG. 2, the upper pouch 21 has a predetermined layered structure having an insulation layer 25, an aluminum layer 24 and an adhesive layer 23 successively, and the lower pouch 22 includes an adhesive layer 23, an aluminum layer 24 and an insulation layer 25.

To carry out sealing of the pouch casing 20, heat and pressure may be applied to the bottom adhesive layer of the upper pouch 21 and the top adhesive layer 23 of the lower pouch 22.

Figure 3:
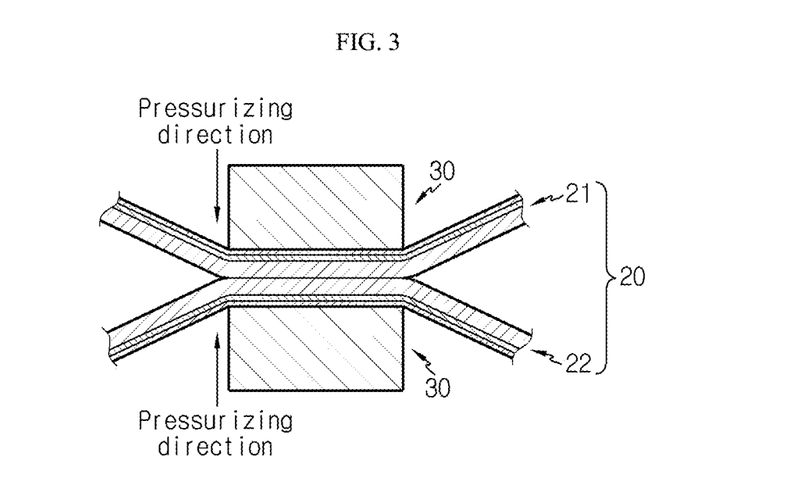
FIG. 3 to FIG. 5 is a schematic view illustrating the temporary attachment region of a sealing portion pushed in a direction toward the inside of a cell when sealing a pouch casing according to the related art.
Figure 4:
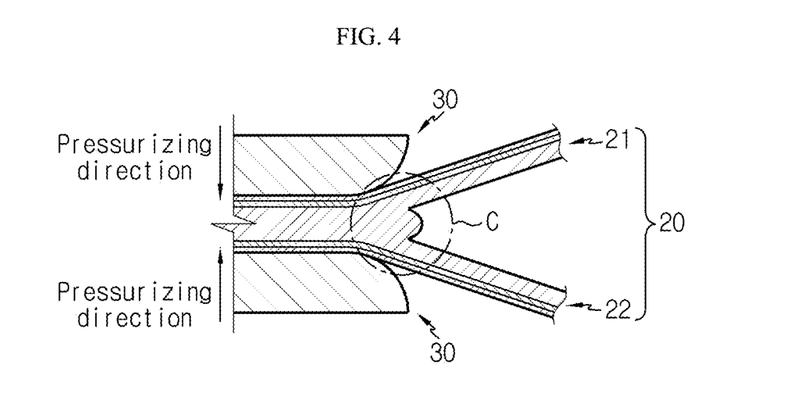
Figure 5:
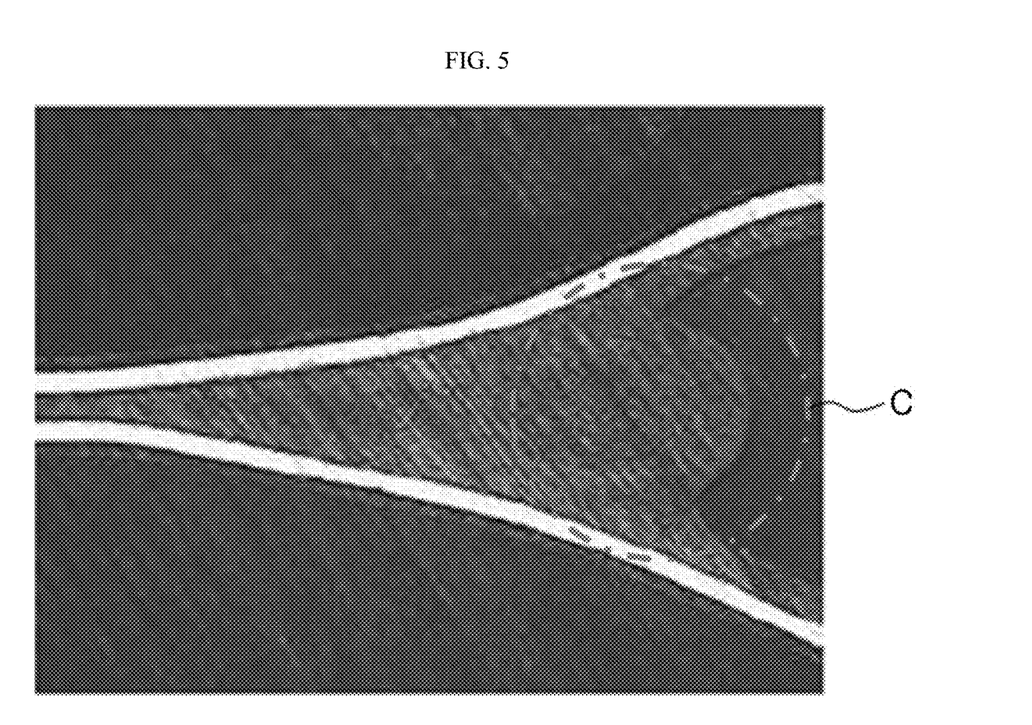

FIG. 3 to FIG. 5 are schematic views illustrating a sealing portion pushed in a direction toward the inside of a cell, when a pouch casing is sealed according to the related art.

Referring to FIG. 3 to FIG. 5, the adhesive layer present at the sealing portion melts and flows due to the heat generated during sealing to form a temporary attachment region C, where the sealing portion is pushed in a direction toward the inside of the cell based on the parallel bonded end of the sealing portion. Such a temporary attachment region has a ball shape locally and the ball-shaped temporary attachment region is vulnerable to insulation and high-temperature durability. Currently, there is no separate system for controlling the shape of such a temporary attachment region.

DISCLOSURE

Technical Problem

The present disclosure is designed to solve the problems of the related art, and therefore the present disclosure is directed to providing a method for sealing a pouch casing which can improve the durability of a sealing portion when sealing a pouch-type secondary battery.

Other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a method for sealing a pouch casing of a pouch-type secondary battery, which includes the steps of: a receiving step in which an electrode assembly is received in an inner space formed between an upper pouch and a lower pouch; and a sealing step in which a first pressure is applied to an outer circumferential sealing portion, where the upper pouch and the lower pouch are sealed, in the longitudinal direction, and then the pressure is relieved, wherein the sealing step is carried out by applying external force to the upper pouch in the upward direction and to the lower pouch in the downward direction, or by applying a second pressure working in perpendicular to the first pressure to the sealing portion from the inner part of the pouch casing in a direction toward the outside.

Herein, the sealing step may be carried out so that the shape of a temporary attachment region, formed by the sealing portion pushed in a direction toward the inner space based on the parallel bonded end of the outer circumferential sealing portion of the upper pouch and the lower pouch, may not have a ball shape locally.

In addition, the sealing step may be carried out by a heating block which performs hot fusion of the outer circumferential sealing portion of the upper pouch and the lower pouch through the transfer of a heat source.

In addition, the sealing step may be carried out by applying external force to the upper pouch in the upward direction and to the lower pouch in the downward direction by using a vacuum adsorption pad.

In addition, the second pressure in the sealing step may be a pneumatic pressure.

In addition, the extent of the external force applied to the upper pouch in the upward direction may be 2-5 times of the weight of the upper pouch, and the extent of the external force applied to the lower pouch in the downward direction may be 2-5 times of the weight of the lower pouch.

In addition, in the sealing step, the external force application time may be 1.5-2 times of the first pressure application time.

In addition, in the sealing step, the second pressure may be 0.1-0.15 MPa.

In addition, in the sealing step, the second pressure application time may be 1.5-2 times of the first pressure application time.

Meanwhile, the upper pouch and the lower pouch independently may include a metal layer, an insulation layer formed on one surface of the metal layer, and an adhesive layer formed on the other surface of the metal layer.

Herein, the metal layer may be an aluminum layer.

In addition, the insulation layer may include polyethylene terephthalate resin, nylon resin or a combination thereof.

Further, the adhesive layer may include casted polypropylene, polypropylene or a combination thereof.

Advantageous Effects

According to the present disclosure, it is possible to transfer heat uniformly to the whole of a portion corresponding to a temporary attachment region during a sealing process of a pouch casing in a pouch-type secondary battery, and to control the temporary attachment region so that it may not have a ball shape locally.

Therefore, it is possible to improve the insulation property and high-temperature durability of the temporary attachment region.

As a result, according to the present disclosure, it is possible to stably ensure the insulation property of a pouch casing of a secondary battery and to effectively prevent ignition, explosion or fire accidents caused by an internal short-circuit.

DESCRIPTION OF DRAWINGS

The accompanying drawings illustrate a preferred embodiment of the present disclosure and together with the foregoing disclosure, serve to provide further understanding of the technical disclosure of the present disclosure, and thus, the present disclosure is not construed as being limited to the drawing.

DESCRIPTION OF DRAWING NUMERALS

20: Pouch casing
21: Upper pouch
22: Lower pouch
30: Press jig
100: Pouch casing
110: Upper pouch
120: Lower pouch

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

In addition, details of well-known features and techniques may be omitted to avoid unnecessarily obscuring the present disclosure. The following embodiments are provided to make those skilled in the art understand the present disclosure more completely, and thus features, sizes, etc. of some constitutional elements in the drawings may be exaggerated for the purpose of well-defined description.

Figure 6:
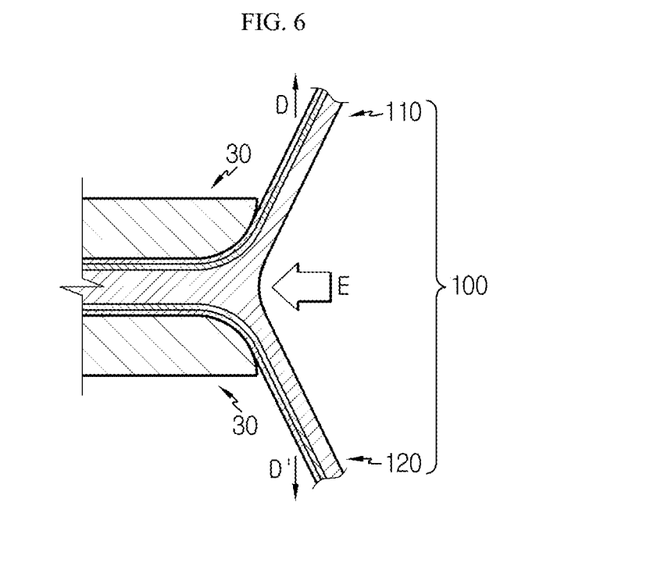
FIG. 6 is a schematic view illustrating the method for sealing a pouch casing according to an embodiment of the present disclosure.

FIG. 6 is a schematic view illustrating the method for sealing a pouch casing according to an embodiment of the present disclosure.

The method for sealing a pouch casing according to an embodiment of the present disclosure includes the steps of: (S10) a receiving step in which an electrode assembly is received in an inner space formed between an upper pouch and a lower pouch; and (S20) a sealing step in which a first pressure is applied to an outer circumferential sealing portion, where the upper pouch and the lower pouch are sealed, in the longitudinal direction, and then the pressure is relieved.

After the electrode assembly is received in the inner space of the pouch casing 100 in receiving step (S10), a step of injecting an electrolyte and a step of aligning the sealing portion of the pouch casing 100 to seal the pouch casing 100 may be further carried out.

Referring to FIG. 6, sealing step S20 is carried out by applying external force to the upper pouch 110 in the upward direction D and to the lower pouch 120 in the downward direction D', or by applying a second pressure working in perpendicular to the first pressure to the sealing portion from the inner part of the pouch casing 100 in a direction E toward the outside.

When external force is applied to the upper pouch 110 in the upward direction D and to the lower pouch 120 in the downward direction D', or a second pressure working in perpendicular to the first pressure is applied to the sealing portion from the inner part of the pouch casing 100 in a direction E toward the outside, the pouch casing 100 is in close contact with a press jig 30 used for the sealing step to the highest degree. Thus, heat transfer occurs uniformly also into the temporary attachment region of the sealing portion pushed in a direction toward the inner space based on the parallel bonded end of the outer circumferential sealing portion. Therefore, it is possible to control the temporary attachment region so that it may not have a ball shape locally.

In this manner, it is possible to improve the insulation property and high-temperature durability of the temporary attachment region. Ultimately, it is possible to stably ensure the insulation property of the pouch casing of a secondary battery and to effectively prevent ignition, explosion and fire accidents caused by an internal short-circuit.

Meanwhile, the extent of the external force applied to the upper pouch in the upward direction and that of the external force applied to the lower pouch in the downward direction may vary with the size and weight of the upper pouch and those of the lower pouch, respectively. Preferably, external force is applied in an extent corresponding to 2-5 times of the weight of each of the upper pouch and the lower pouch. For example, in the case of a pouch-type secondary battery for vehicles, an upper or lower pouch has a weight of about 10 gf. In this case, the extent of external force applied to each of the upper pouch and the lower pouch is preferably about 20-50 gf. When external force is applied to an extent less than 2 times of the weight, the temporary attachment region may have a ball shape locally. When external force is applied to an extent larger than 5 times of the weight, sealing of the upper and lower pouches may be affected adversely and the adhesive layer melted upon sealing may be deformed.

In addition, in the sealing step, the external force application time may be 1.5-2-times of the first pressure application time.

In other words, while the first pressure working on the upper and lower pouches is applied, application of the external force is started simultaneously, so that the external force may be still applied even after the first pressure is relieved (depressurized). In addition, the total external force application time may be 1.5-2 times of the first pressure application time.

This considers the time required for cooling the adhesive layer of the pouch to allow maintenance of the shape after the adhesive layer is melted during sealing. When the time is less than the above-defined range, the adhesive layer cannot be cooled sufficiently so that the temporary attachment region may not be controlled adequately. When the time exceeds the above-defined range, unnecessary external force is applied after cooling is already accomplished, which is not cost efficient.

Meanwhile, the second pressure may be 0.1-0.15 Mpa. Herein, when the second pressure is less than 0.1 MPa, sufficient force cannot be applied to the temporary attachment region, thereby making it difficult to control the shape of the temporary attachment region. When the second pressure exceeds 0.15 MPa, the adhesive layer of the pouch melted during sealing may be deformed undesirably.

In addition, in the sealing step, the second pressure application time may be 1.5-2 times of the first pressure application time.

In other words, while the first pressure working on the upper and lower pouches is applied, application of the second pressure is started simultaneously, so that the second pressure may be still applied even after the first pressure is relieved (depressurized). In addition, the total second pressure application time may be 1.5-2 times of the first pressure application time.

This considers the time required for cooling the adhesive layer of the pouch to allow maintenance of the shape after the adhesive layer is melted during sealing. When the time is less than the above-defined range, the adhesive layer cannot be cooled sufficiently so that the temporary attachment region may not be controlled adequately. When the time exceeds the above-defined range, the second pressure is applied unnecessarily after cooling is already accomplished, which is not cost efficient.

Meanwhile, the sealing step may be carried out by a heating block which performs hot fusion of the outer circumferential sealing portion of the upper pouch and the lower pouch through the transfer of a heat source.

Herein, each of the upper pouch 110 and the lower pouch 120 includes a multi-layer structure having a metal layer including an insulation layer, an adhesive layer, or the like. According to the present disclosure, sealing step S20 is carried out by applying heat and pressure from a heating block to the outer circumferential adhesive layer of the upper pouch 110 and the lower pouch 120.

Meanwhile, in sealing step S20, the external force working on each of the upper pouch and the lower pouch may be applied by a vacuum adsorption pad and the second pressure applied to the sealing portion may be applied by pneumatic pressure.

Figure 7:
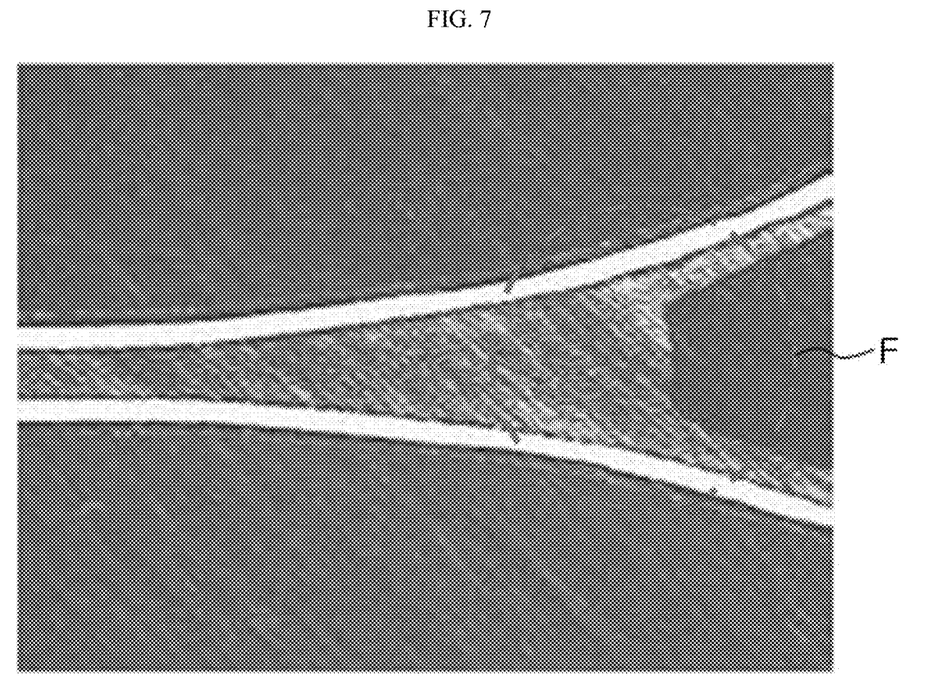
FIG. 7 shows a sealing portion formed by the method for sealing a pouch casing according to an embodiment of the present disclosure.
Figure 8:
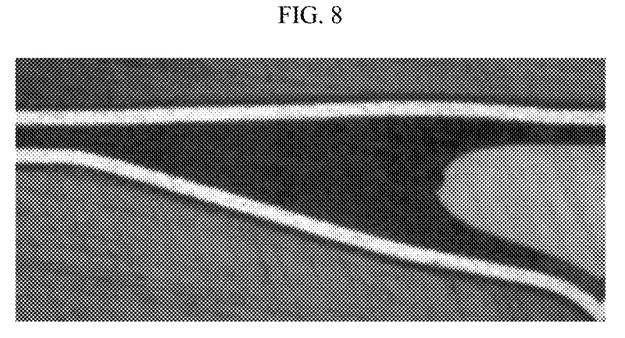
FIG. 8 and FIG. 9 show a sealing portion formed by the method for sealing a pouch casing according to Examples of the present disclosure.
Figure 9:
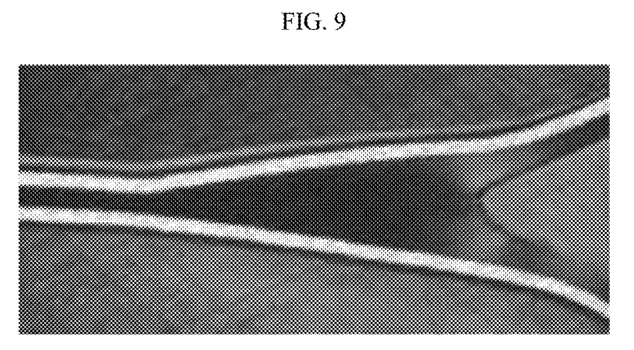
Figure 10:
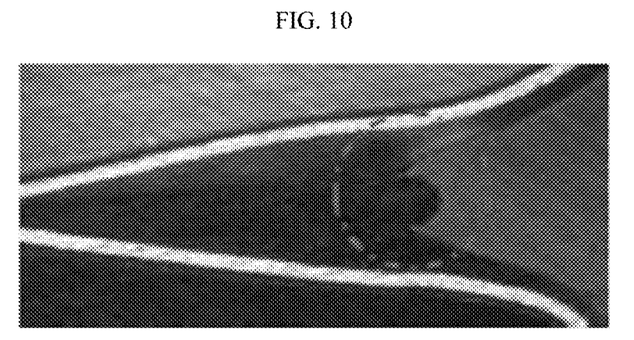
FIG. 10 and FIG. 11 show a sealing portion formed by the method for sealing a pouch casing according to Comparative Examples of the present disclosure.
Figure 11:
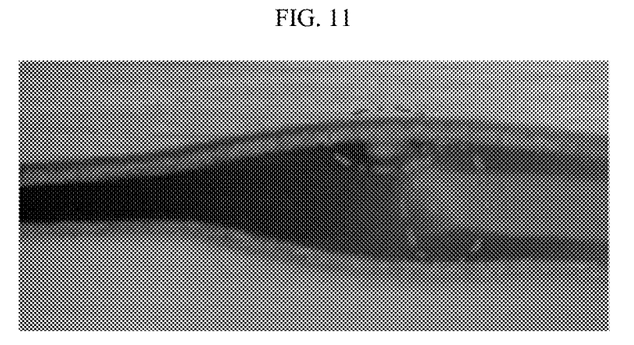
Figure 12:
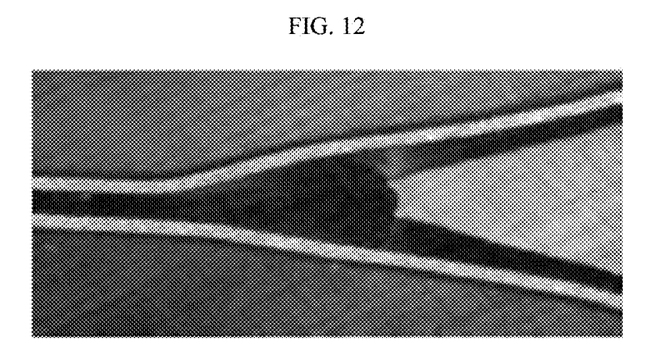
FIG. 12 and FIG. 13 show a sealing portion formed by the method for sealing a pouch casing according to Examples of the present disclosure.
Figure 13:
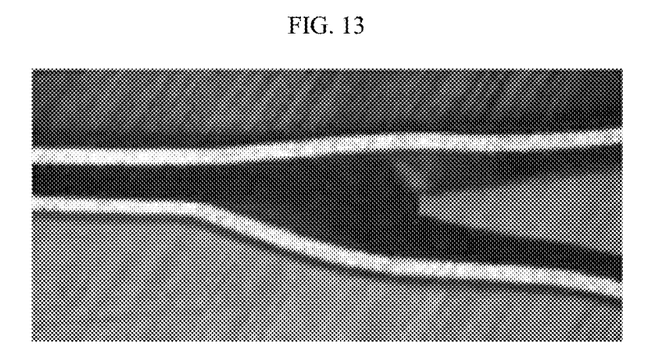
Figure 14:
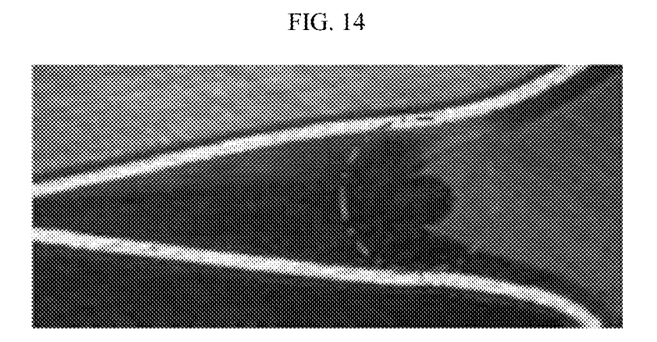
FIG. 14 and FIG. 15 show a sealing portion formed by the method for sealing a pouch casing according to Comparative Examples of the present disclosure.
Figure 15:
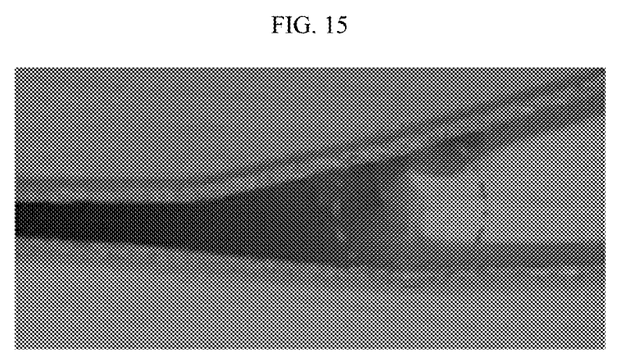

FIG. 7 shows a sealing portion formed by the method for sealing a pouch according to an embodiment of the present disclosure. Referring to FIG. 7, it can be seen that the temporary attachment region formed in the inner space of the secondary battery shows no ball shape locally.

Meanwhile, the upper pouch and the lower pouch may include a metal layer inserted therein in order to protect an electrolyte and an electrode assembly introduced into the pouch casing, to supplement the electrochemical properties of a battery cell and to improve heat dissipation property, or the like. Each of the upper pouch and the lower pouch may include a metal layer, an insulation layer formed on one surface of the metal layer and an adhesive layer formed on the other surface of the metal layer.

Herein, the metal layer may be foil made of aluminum.

In addition, the insulation layer coated with an insulation material, such as polyethylene terephthalate (PET) resin or nylon resin, may be formed on one surface of the metal layer in order to ensure insulation between the battery cell and the outside.

In addition, the adhesive layer, such as casted polypropylene (CPP) or polypropylene (PP), may be formed on the other surface of the metal layer in order to attach the upper pouch and the lower pouch to each other. Such an adhesive layer not only performs adhesion between the upper pouch and the lower pouch but also functions as an insulation layer which prevents electric contact between the metal layer and the electrolyte injected into the pouch casing.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

1. Sealing Test for Upper Pouch and Lower Pouch

A sealing test was carried out for an upper pouch and lower pouch including a metal foil layer made of aluminum, a polyethylene terephthalate resin layer formed on one surface of the metal foil layer, and a polypropylene adhesive layer formed on the other surface of the metal foil layer, and having a weight of 10 gf. Herein, when the upper pouch and the lower pouch are sealed, the adhesive layers were allowed to be in contact with each other.

2. Evaluation of Physical Properties Depending on Effect of External Force

A test is carried out by applying a different extent of external force to each of the upper pouch and the lower pouch. The following Table 1 shows the test conditions, shape of a temporary attachment region and high-temperature sealing strength. Herein, the high-temperature sealing strength was determined by measuring sealing strength in a chamber at a high temperature of 80° C. (measured at a rate of 50 mm/min). In addition, the test was carried out while controlling the external force application time might be 1.5 times of the first pressure application time. When the external force application time exceeds 2 times of the first pressure application time, the adhesive layer cannot be controlled sufficiently and sealing strength is degraded.

TABLE 1

|  | Example 1 | Example 2 | Comparative Example 1 | Comparative Example 2 |
| --- | --- | --- | --- | --- |
| Extent of external force | 20 gf | 50 gf | 0 | 100 gf |
| Shape of temporary attachment region | Ball shape is not generated | Ball shape is not generated | Ball shape is generated | Deformation |
| High-temperature sealing strength | 9.3 kgf/15 mm | 8.5 kgf/15 mm | 4.9 kgf/15 mm | 2.9 kgf/15 mm |

In Example 1, external force corresponding to 2 times of the weight of the pouch was applied to each of the upper pouch and the lower pouch in the upward direction and the downward direction, respectively. In Example 2, external force corresponding to 5 times of the weight of the pouch was applied. In the case of Examples, it can be seen that the shape of temporary attachment region is not a ball shape but has an adequate degree of sealing strength.

Meanwhile, in the case of Comparative Example 1 in which no external force is applied, the shape of temporary attachment region is a ball shape locally and the high-temperature sealing strength is decreased to about a half of the high-temperature sealing strength of each example.

In addition, in the case of Comparative Example 2 in which external force is applied excessively, the interface between the metal layer and the adhesive layer is damaged and the shape of temporary attachment region is deformed. Particularly, it can be seen that Comparative Example 2 shows a high-temperature sealing strength of 2.9 kgf/15 mm, which is significantly lower than that of each Example.

FIG. 8 to FIG. 11 show the shape of each of the sealing portions according to Examples 1 and 2 and Comparative Examples 1 and 2. It can be seen that the drawings support the results of the above Table 1.

3. Evaluation of Physical Properties of Sealing Portion Depending on Effect of Second Pressure (Pneumatic Pressure)

While the upper pouch and the lower pouch are pressurized against each other under the first pressure, pneumatic pressure as second pressure working in perpendicular to the first pressure was applied to the sealing portion in a direction toward the outside of the pouch casing to carry out a test. The following Table 2 shows the test conditions, the shape of temporary attachment region and high-temperature sealing strength according to each of Examples and Comparative Examples. Herein, the high-temperature sealing strength was determined by measuring sealing strength in a chamber at a high temperature 80° C. (measured at a rate of 50 mm/min), and the second pressure (pneumatic pressure) application time was controlled to be 1.5 times of the first pressure application time. When the pneumatic pressure application time was larger than 2 times of the first pressure application time, the temporary attachment region could not be controlled sufficiently and the sealing strength was decreased.

TABLE 2

|  | Example 3 | Example 4 | Comparative Example 3 | Comparative Example 4 |
| --- | --- | --- | --- | --- |
| Extent of second pressure | 0.1 MPa | 0.15 MPa | 0 | 0.2 MPa |
| Shape of temporary attachment region | Ball shape is reduced | Ball shape is not generated | Ball shape is generated | Adhesive layer is damaged |
| High-temperature sealing strength | 7.3 kgf/15 mm | 9.0 kgf/15 mm | 4.9 kgf/15 mm | 4.3 kgf/15 mm |

In the case of Example 3, although a minute ball shape is formed in the temporary attachment region, the ball shape is insignificant as compared to Comparative Examples. In the case of Example 4, no ball shape is generated and an adequate degree of sealing strength is provided.

Meanwhile, in the case of Comparative Example 3 in which pneumatic pressure as second pressure is not applied, it can be seen that the shape of temporary attachment region is a ball shape locally and the high-temperature sealing strength is 4.9 kgf/15 mm, which is significantly lower than that of each Example.

In addition, in the case of Comparative Example 4 in which the second pressure is applied excessively, the adhesive layer is damaged. In addition, it can be seen that Comparative Example 4 shows a high-temperature sealing strength of 4.3 kgf/15 mm, which is significantly lower than that of each Example.

FIG. 12 to FIG. 15 show the shape of each of the sealing portions according to Examples 3 and 4 and Comparative Examples 3 and 4. It can be seen that the drawings support the results of the above Table 2.

4. Evaluation of Physical Properties of Sealing Portion Depending on Effect of Combination of External Force with Second Pressure (Pneumatic Pressure)

A test was carried out by applying external force according to Example 1 in combination with the second pressure according to Example 3. The following Table 3 shows the test conditions, the shape of temporary attachment region and high-temperature sealing strength according to Example 5.

TABLE 3

|  | Example 5 |
| --- | --- |
| Extent of external force | 20 gf |
| Extent of second pressure | 0.1 MPa |
| Shape of temporary attachment region | Ball shape is not generated |
| High-temperature sealing strength | 8.5 kgf/15 mm |

Figure 16:
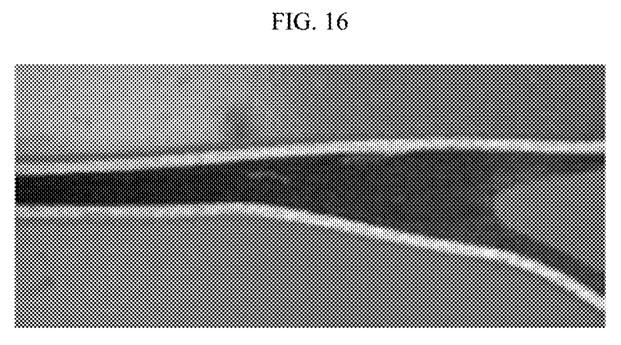
FIG. 16 shows a sealing portion formed by the method for sealing a pouch casing according to Example of the present disclosure.

In the case of Example 5, it can be seen that no ball shape of temporary attachment region is generated and an adequate degree of sealing strength is provided. FIG. 16 shows the sealing portion according to example 5.

The features described in each of embodiments may be realized in a single embodiment in combination. On the contrary, various features described in a single embodiment may be realized in different embodiments individually or in an adequate sub-combination.

In the specification or drawings, the terms, such as 'top', 'bottom', 'inner' and 'outer', are used to differentiate one element relatively from another element and have instrumental concepts to increase the efficiency of description. Thus, such terms should not be interpreted as concepts used to differentiate any physical position or order on the absolute basis.

The present disclosure has been described in detail with reference to particular embodiments and drawings, but it should be understood that the scope of the present disclosure is not limited thereto. It should be also understood that various changes and modifications within the scope of the disclosure will become apparent to those skilled in the art from this detailed description.

What is claimed is:

1. A method for sealing a pouch casing of a pouch-type secondary battery, which comprises the steps of:
a receiving step in which an electrode assembly is received in an inner space formed between an upper pouch and a lower pouch; and
a sealing step in which a first pressure is applied by a press jig to an outer circumferential sealing portion, where the upper pouch and the lower pouch are sealed, in the longitudinal direction, and then the pressure is relieved,
wherein the sealing step is carried out by applying an external force to the upper pouch in the upward direction and to the lower pouch in the downward direction, or by applying a second pressure working in perpendicular to the first pressure to the sealing portion from the inner part of the pouch casing in a direction toward the outside, and wherein the external force or the second pressure is applied separately from the first pressure applied by the press jig.

2. The method for sealing a pouch casing according to claim 1, wherein the sealing step is carried out so that a shape of a temporary attachment region, formed by the sealing portion pushed in a direction toward the inner space based on a parallel bonded end of the outer circumferential sealing portion of the upper pouch and the lower pouch, may not have a ball shape locally.

3. The method for sealing a pouch casing according to claim 1, wherein the sealing step is carried out by a heating block which performs hot fusion of the outer circumferential sealing portion of the upper pouch and the lower pouch through the transfer of a heat source.

4. The method for sealing a pouch casing according to claim 1, wherein the sealing step is carried out by applying external force to the upper pouch in the upward direction and to the lower pouch in the downward direction by using a vacuum adsorption pad.

5. The method for sealing a pouch casing according to claim 1, wherein the second pressure in the sealing step is a pneumatic pressure.

6. The method for sealing a pouch casing according to claim 1, wherein the extent of the external force applied to the upper pouch in the upward direction is 2-5 times of the weight of the upper pouch, and the extent of the external force applied to the lower pouch in the downward direction is 2-5 times of the weight of the lower pouch.

7. The method for sealing a pouch casing according to claim 1, wherein an external force application time in the sealing step is 1.5-2 times of a first pressure application time.

8. The method for sealing a pouch casing according to claim 1, wherein the second pressure in the sealing step is 0.1-0.15 MPa.

9. The method for sealing a pouch casing according to claim 1, wherein a second pressure application time in the sealing step is 1.5-2 times of a first pressure application time.

10. The method for sealing a pouch casing according to claim 1, wherein the upper pouch and the lower pouch independently include a metal layer, an insulation layer formed on one surface of the metal layer, and an adhesive layer formed on another surface of the metal layer.

11. The method for sealing a pouch casing according to claim 10, wherein the metal layer is an aluminum layer.

12. The method for sealing a pouch casing according to claim 10, wherein the insulation layer includes polyethylene terephthalate resin, nylon resin or a combination thereof.

13. The method for sealing a pouch casing according to claim 10, wherein the adhesive layer includes casted polypropylene, polypropylene or a combination thereof.

* * * * *